A. STEWART.
Feed-Cooker.
No. 199,593. Patented Jan. 22, 1878.
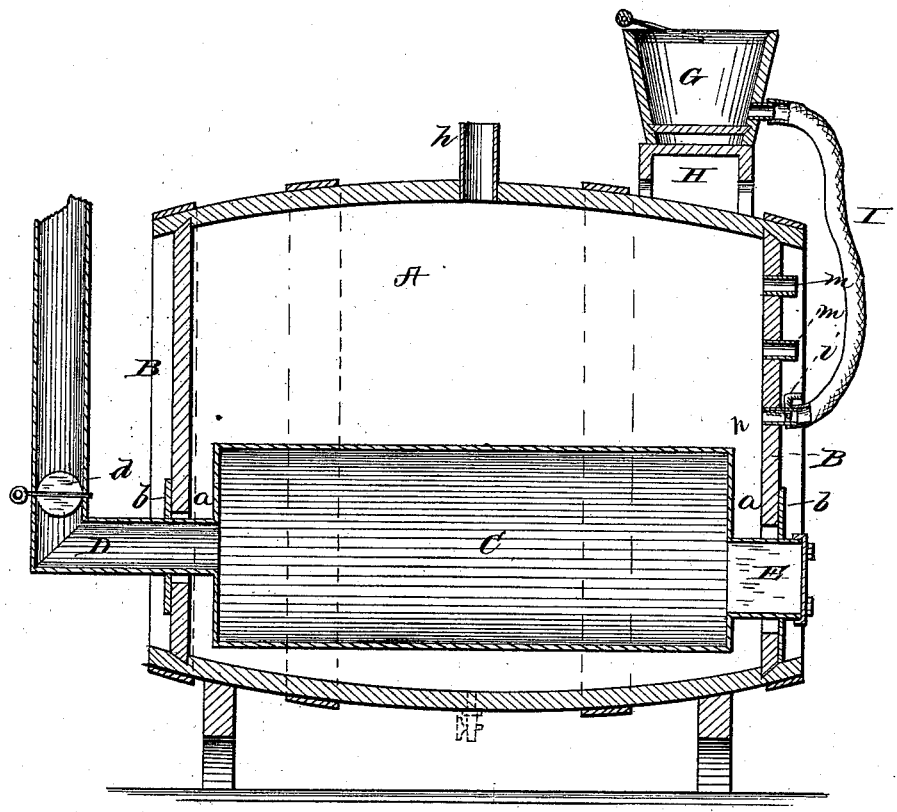

UNITED STATES PATENT OFFICE.

ARCHIBALD STEWART, OF KEOTA, IOWA.

IMPROVEMENT IN FEED-COOKERS.

Specification forming part of Letters Patent No. 199,593, dated January 22, 1878; application filed November 26, 1877.

*To all whom it may concern:*

Be it known that I, ARCHIBALD STEWART, of Keota, in the county of Keokuk, and in the State of Iowa, have invented certain new and useful Improvements in Feed-Cookers; and do hereby declare that the following is a full, clear, and exact description thereof, reference being had to the accompanying drawing, and to the letters of reference marked thereon, making a part of this specification.

The nature of my invention consists in the construction and arrangement of an agricultural boiler for cooking feed, as will be hereinafter more fully set forth.

In order to enable others skilled in the art to which my invention appertains to make and use the same, I will now proceed to describe its construction and operation, referring to the annexed drawing, which represents a longitudinal vertical section of my boiler.

A represents a barrel or similar water-tight vessel, placed horizontally, with the heads B B standing vertically, and containing within it a fire-box, C. This fire-box is circular in form, and extends nearly the entire length of the barrel, but leaving a space or water-collar at $a\ a$, between each end of the fire-box and the head of the barrel, which preserves the barrel from the heat, preventing the solder of the plates $b\ b$ from melting, and increases the heating-surface.

D is the smoke-pipe, and extends through the end or head of the barrel, with the plate or collar $b$ soldered to it and fastened to the head. It has an elbow and a damper, $d$, to regulate the draft and retain the heat within the barrel.

The fire-door E is in the end or head of the barrel, opposite to the smoke-pipe, with the plate or collar $b$ attached, the same as for the smoke-pipe.

By this arrangement wood the entire length of the fire-box can readily be used as fuel.

The steam pipe or conductor is attached at $h$ to the center of the barrel over the fire-box.

It will be noticed that in my boiler the cutting of the barrel to admit the fire-box is all done in the heads instead of the staves, which does not weaken the barrel or prevent driving up the hoops when the barrel shrinks.

The steamer being horizontal, the entire fire-box is surrounded by water, which is not the case in the upright-barrel steamer; and this gives the largest possible percentage of heating-surface.

The barrel is perfectly protected from the fire by having water between the wood and the fire at every point.

I provide the steamer with a self-feeder, consisting of a tub or bucket, G, placed upon a stool, H, on top of the barrel; and this bucket is, by a flexible tube, I, connected with the barrel. At the connection of said tube with the barrel is a stop-cock, $i$. The steamer can thus be replenished with water while in operation without a pump or being compelled to let the steam go down. This puts the water-supply completely under the control of the operator, and the steamer can be worked as long as desired without stopping.

The flexible tube I may be used for drawing off hot water when required for other uses.

At $m\ m$, in one head of the barrel, are to be attached ordinary faucets or gages, to ascertain the state of the water in the barrel.

The entire apparatus may be mounted on wheels, so as to be easily moved from place to place.

Having thus fully described my invention, what I claim as new, and desire to secure by Letters Patent, is—

The combination of the horizontal barrel A with exterior self-feeder G, the two being connected by the flexible pipe I, the fire-box C, collars $a\ a$ at each end, and the smoke-pipe D, all constructed substantially as and for the purposes herein set forth.

In testimony that I claim the foregoing I have hereunto set my hand this 26th day of October, 1877.

ARCHIBALD STEWART.

Witnesses:
   B. F. ELLIOTT,
   J. F. GRAHAM.